April 15, 1930.   A. E. OSWALD   1,754,645
ELECTRIC MOTOR
Original Filed Nov. 30, 1920
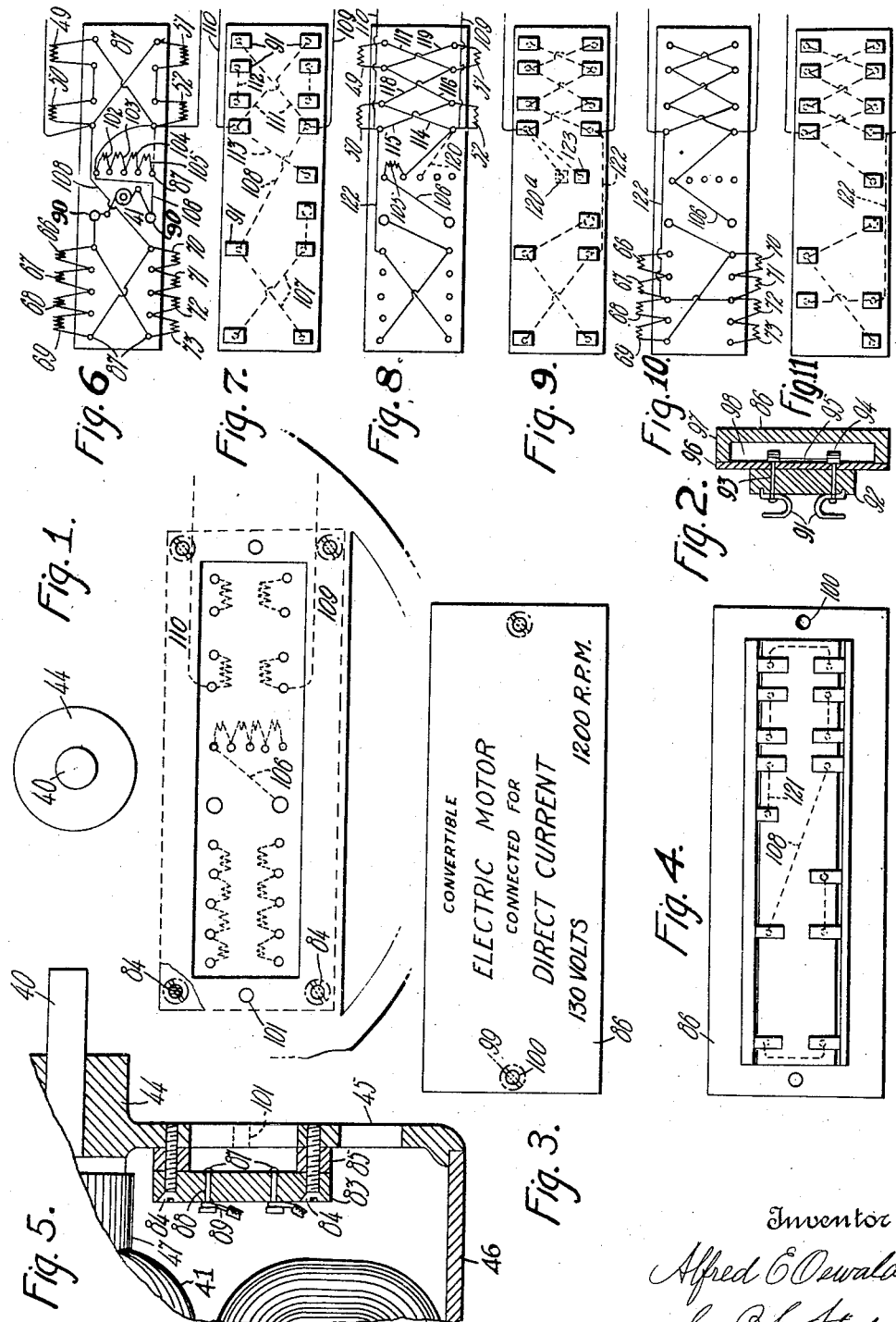

Patented Apr. 15, 1930

1,754,645

UNITED STATES PATENT OFFICE

ALFRED E. OSWALD, OF HACKENSACK, NEW JERSEY, ASSIGNOR TO UNDERWOOD ELLIOTT FISHER COMPANY, OF NEW YORK, N. Y., A CORPORATION OF DELAWARE

ELECTRIC MOTOR

Original application filed November 30, 1920, Serial No. 427,346. Divided and this application filed August 18, 1925. Serial No. 50,928.

This invention relates to terminals connecting boards for electric motors, and one of its main objects is to adapt the motor for work under a wide variety of conditions, thereby substantially increasing its range of usefulness.

Many of the improvements relate to terminal connecting boards for the use of the motor only with alternating current; but provision is also made for adapting it by other terminal connections into a direct current motor without substantially changing the same. The motor, supplied with suitable terminal connecting boards, may be used for any commercial frequency and a great range of voltage. The adaptation of the motor for different circuits may be made by an inexperienced person. This invention has great value for motors of less than one horse power, although the invention is not limited thereto. The number of motors that a manufacturer needs to produce in order to meet widely varying demands may be greatly reduced.

For alternating current I employ a commutator, which connects the rotating armature in series with novel stationary auxiliary coils, and I control the speed by means of a novel relationship between the armature auxiliary coils and field coils. The field coils are in shunt around both the armature and auxiliary coils, the last being electrically opposed to the field coils, and acting in conjunction with a novel core in a manner to render the rotor self-corrective as to speed under varying loads. The problem of adapting the motor for different frequencies is solved by winding for the highest frequency and connecting the field coils, and also the auxiliary coils, in parallel, series or otherwise. The motor is adapted for different voltages in alternating work, by further modifying or rearranging the relationship between the coils or sub-coils; numerous combinations being feasible. The desired rate of rotation is secured by certain modifications of such arrangements.

It is usual to wind motors differently for different frequencies, so that a motor that is wound for one circuit cannot be successfully used on another circuit having a different frequency. Therefore, it is necessary for a dealer to keep a great variety of motors in stock. One of the objects of the invention is to produce a motor that will successfully operate in different circuits having different frequencies.

It is usual also to wind motors differently for use with circuits having different voltages, and this also makes it impracticable to use the same motor on different circuits, and further makes it necessary to keep a variety of motors in stock. Since also the voltage varies in different circuits having the same frequency, a further complication ensues; and it has been necessary, therefore, to keep a very large variety of motors in stock. One of the objects of this invention is to overcome this difficulty also, and to provide means whereby a motor can be used for circuits having different voltages; and the improvement is carried so far that the motor can be used with circuits having different frequencies as well as different voltages for the same frequency.

This invention provides means whereby the motor can be used with an alternating current not only for different frequencies and different voltages, but also for different speeds, as may be required, thereby still further enlarging the field of usefulness of the invention and making possible still further reduction in the assortment of motors that it is necessary to carry in stock.

One feature of improvement is the facility and certainty with which the connections can be changed, even by one unfamiliar with the motor. There is provided in the motor-frame a board or plate on which is arranged a full set of terminals for the different coils, the armature and the resistance. Upon a separate board or plate attached thereto and removable therefrom, are arranged the necessary contacts having appropriate connections for the work in hand. Each removable contact plate may be marked to indicate the work that will be performed by the motor when said plate is fastened thereto. An assortment of these removable plates may be kept in stock, so that when a dealer receives an order for a motor for either alternating or direct current, and for a certain frequency and a certain voltage and speed, he needs only to select the plate which is marked for such current, frequency, voltage and speed, and secure the same upon the motor, whereupon it is ready for the customer's use.

This is a division of my application Serial No. 427,346, filed November 30, 1920 (now Patent No. 1,554,647, dated September 22, 1925).

Other features and advantages will hereinafter appear.

In the accompanying drawings,

Figure 1 is a view of the end portion of the motor frame, to illustrate a terminal board or plate mounted therein, for use with any of the contact plates seen at other figures.

Figure 2 is a cross-section, Figure 3 is a top plan and Figure 4 is an inverted plan of one form of contact plate to be fastened to the machine, with its contacts for engaging the terminals seen at Figure 1, whereby the motor is alterable for use with direct current, 130 volts.

Figure 5 is a fragmentary sectional view to illustrate in cross-section the arrangement of the contact plate seen at Figure 1.

Figure 6 is a diagram of the connections when the motor is to be used for direct current, 50 volts.

Figure 7 is an inverted plan of the contact plate which is screwed in place in the end of the motor to produce the connections seen at Figure 6, thereby altering or converting the motor as explained in connection with Figure 6.

Figure 8 is a diagram of the connections when the motor is to be used for alternating current, 40 cycles, 130 volts.

Figure 9 is an inverted view of the companion contact plate.

Figure 10 is a diagram of the connections when the motor is to be used for alternating current, 120 volts, 60 cycles. The same diagram can be used when both the voltage and the cycles are doubled, that is, 240 volts and 120 cycles; and the same rule applies to the other diagrams.

Figure 11 is a companion diagram of the contact plate.

Proceeding from the foregoing general statements to a more detailed description, the motor shaft is seen at 40, Figure 5, carrying an armature 41, comprising standard windings suitable for alternating current, or fewer than would be the case with a corresponding direct current motor. The core of the armature is laminated. Said shaft is journaled in bearings 44 carried by spider-like heads 45 of the framework, which latter also comprises a barrel, drum or casing 46. The armature is provided with a commutator 47 to co-operate with brushes, not shown.

The field of the motor is wound with a plurality of coils including a set of main field coils 49, 50, 51 and 52, and a set of auxiliary coils 66, 67, 68, 69, 70, 71, 72 and 73, diagrammatically shown in Figures 6, 8 and 10 of the drawings, and which are more specifically referred to in my Patent 1,554,647, dated September 22, 1925.

At Figure 5 is shown a section of a terminal plate 83 of insulating material secured upon the inner side of the head 45 by means of screws 84; spacing collars 85 being placed upon the screws to position the terminal plate 83 well within the head, so as to accommodate a contact plate or block 86, see Figures 2 and 3, which is removable and hence omitted from Figure 5. The terminals on the plate 83 are in the form of heads 87 formed on posts 88 in the terminal plate which are connected to the ends 89 of the various windings or coils. The arrangement of the terminals in the terminal plate is seen at Figure 6, which also shows a diagram of the coils, etc., the commutator terminals being indicated at 90. Appropriate contacts 91, see Figure 2, project from the contact plate 86, which includes an insulating block 92 to which they are secured by copper rivets 93, the heads 94 of which may be electrically connected by wires 95 in various ways to meet various requirements. The block 92 may be secured to the bottom of a plate 96, Figure 2, which, together with the top of the contact plate 86, may form a box having sides 97 and ends 98 to contain the wires 95 and heads 94. Screws 99 may pass down through holes 100 in the cover plate 86 and the bottom plate 96 and thread into holes 101, Figure 5, in the head 45 of the motor casing for detachably securing the contact plate in position with the contacts 91 engaging the appropriate terminal heads 87.

At Figure 6, which shows connections for direct current 50 volts, the field coils 49, 50 are in series with each other and in parallel with the field coils 51, 52, the latter being also in series with each other, thereby making a semi-parallel field of lower resistance, suitable for the low voltage. For the same reason the auxiliary coils 66 to 69 are connected in parallel with the auxiliary coils 70 to 73 throughout the diagram; that is, 66 to 69 are all in series, and the same is true of 70 to 73. These auxiliary coils are always connected up to help the field coils for direct current, and are in series with the armature 41 in all the drawings. At Figure 6 and in all the remaining diagrams, is shown a resistance comprising coils 102, 103, 104, 105, but for the low voltage of 50 none of this resistance is needed. If the voltage were increased to 60, then coil 102 would be cut in, and so on for higher voltages.

At Figure 7 is shown an inverted plan of the contact plate for co-operating with the set of terminals 87 to effect the connections seen at Figure 6. This Figure 7 shows contacts for all of the field coil terminals, and these contacts are so wired as to secure the desired parallel between the sub-sets of field coils and also between the sub-sets of auxiliary coils. The auxiliary coils, the armature, and the resistance are in series in all the diagrams. At Figures 6 and 7 each pair of field coils is independently connected across the line, or in shunt around the armature circuit. At Figure 6 is shown a wire 106, which is provided at each of the terminal plates 83 throughout the drawings, for permanently connecting one terminal of the armature circuit with the last of the resistance terminals, viz., the terminal which is employed when no resistance is used. At the lower part of Figure 7 it will be seen that the four auxiliary coil terminals 91 are connected by diagonal wires 107 to bring the sets of auxiliary coils into parallel, and that another wire 108 leads from one of the upper auxiliaries to the lowest field terminal on the opposite edge of the plate, which is permanently connected to one of the mains 109. The other main is designated as 110, and is permanently connected to the other of the two lowest field coil contacts; the desired parallelism of the field coils being secured by cross wires 111 and series wiring 112. A wire 113 connects the left-hand lowest field contact at Figure 7 with the resistance contact, which is connected by permanent wire 106 to the armature circuit.

Figure 8 indicates the connections for alternating current, 40 cycles, 130 volts. Figure 8 shows the field coils connected separately across the line; all the field coils being in parallel to make it suitable for 130 volts, 40 cycles. To trace the connection of the field coils, it will be seen that the current coming down one main 110 passes up through coil 50 and returns through diagonal wire 114 to the other main 109. Again, the current flows from main 110 through diagonal wires 115, 116 to coil 49 and returns through diagonals 117, 118, 114 to main 109. Again, the current passes through main 110 across diagonal 115 to coil 52, and then back to the main 109. The current also flows through 110 and through diagonals 115, 116 and 119 to coil 51, and then through diagonals 118, 114 to the main 109. The auxiliary coils are connected to one another in the same manner, as shown in Figure 6. These auxiliary coils are here connected to oppose the field coils, for reasons hereinbefore explained. One of the resistance coils 105 is shown as included in the armature circuit, to permit the use of the motor on 130 volt current; the same effect being produced as though the motor were running on 120 volts without any resistance, so that the desired speed is secured. If it were desired to use 140 volts instead of 130, another coil of the resistance would be cut in, as indicated by the wiring 120. If it were desired to cut down speed, certain of the auxiliary coils 66 to 73 would be cut in, as will be presently explained in connection with other diagrams.

In manufacturing the terminal plates and contact plates for any given voltage, frequency and speed, the contacts and wiring may be connected up by following the general principles herein outlined, and then the motor can be tested for speed. If the voltage is too high or low, resistance can be cut in or out; and if the speed is too high or low, one or more of the auxiliary coils may be cut in or cut out until substantially the desired speed is secured, whereupon the voltage, frequency and speed may be stamped upon the contact plate or device, which may be kept as a pattern. Then duplicates may be made of this plate or device and kept in stock, so that a motor may be supplied at any time to meet those conditions, without change in the motor.

It will also be understood that with direct current resistance is depended upon for taking care of both voltage and speed in making the final adjustments of a pattern plate or device. In other words, the motor is first rigged up to give approximately the desired result, and then the contacts in the pattern plate or device are shifted or placed, so as to get the final result desired; and this serves as a pattern for all contact plates or devices where the motor is to be used under those conditions. The same method may be followed in getting up every pattern contact plate or device.

Figure 9 shows the arrangement of contacts for effecting the connections seen at Figure 8. If connections is to be made at 120, the contact is placed as seen in dotted lines at 120ª, instead of in the full-line position, as at 123.

Figure 10 shows a plate suitable for using the motor with an alternating current of 120 volts, 60 cycles. The field coils are connected individually in parallel, as at Figure 8. No resistance is cut in. The auxiliary coils are opposed to the field coils, as at Figure 8. However, the auxiliary coils 66 and 67, 72 and 73 are cut out, as will be readily understood from the wiring. These four auxiliary coils are cut out because higher frequency is employed. At Figure 10 no resistance is cut in and it corresponds in other respects with Figure 8.

Figure 11 shows the contact plate for securing the Figure 10 connections, and will be readily understood in view of the explanations of Figures 7 and 9.

The above examples of how the connections may be varied to adapt the motor for a few of the different conditions of voltage and frequency found in practice, will serve to illustrate the purpose of this invention. It will, of course, be understood that many changes may be made in the connections to suit the requirements of the case in hand.

Figure 1 shows the terminal plate in place in the head of the motor and ready for the attachment thereto of any of the contact plates seen in the various diagrams. The coils are indicated diagrammatically.

Figure 4 shows a contact plate that may be employed for connecting up the coils for direct current, 130 volts; the field coils being all in series, so as to secure enough windings to give the proper resistance. In other respects the connections may be the same as at Figures 6 and 7. The wire 121 at Figure 4 connects to the opposite ends of the rheostat from the permanent wire 106, the entire resistance being in series with the armature, on account of the increased voltage.

It will be understood that to produce a motor that can be used for circuits having different voltages and different frequencies, as well as different voltages for the same frequency, the coil connections may be shifted. For lowest voltage the coils may be connected in parallel so as to keep down the inductance and resistance and enable the motor to take the desired power from the line. For highest voltage the coils would be connected in series so as to secure great inductance and resistance and prevent the motor from taking too much current. For different combinations of frequency and voltage, a corresponding combination of coils may be employed. In a circuit having high frequency and low voltage, the coils may all be in parallel. For low frequency and high voltage, they may all be in series. For other combinations of frequency and voltage, there are used corresponding connections of the coils. These combinations may be numerous and provide for the usual combination of voltage and frequency. There might be 30 or more combinations of the coils; but the windings remain always the same, and in all cases all of the field and armature windings may be used.

It will be understood that by substituting contact plates, the D. C. arrangement illustrated at Figure 6 may be used for voltages of from 85 down to 45. The A. C. arrangement at Figures 8 and 10 may likewise be used for circuits having different frequencies and voltages, the higher the voltage the greater the number of cycles as a general thing.

It will thus be seen that in practicing certain of the improvements, only a few motors need be kept in stock, whereas a great variety of wants may be readily supplied by merely keeping in stock an assortment of relatively simple and inexpensive contact plates. Confusion and mistakes in the use of the plates are avoided because each one may be plainly marked with the appropriate designations.

It will also be seen that where the owner of a motor has occasion to use the same in a different circuit or for different speed or frequency, etc., he needs only to secure from the dealer an appropriate plate and substitute it for the old plate on the motor, whereupon it is ready for use in the new environment, thus avoiding the necessity of purchasing a new motor. When the user has to employ the motor in a variety of circuits, as in the case of a portable machine, he may purchase a motor with a complete set of contact plates, so that he can use it under all ordinary conditions. The connections are made automatically, by fastening the appropriate contact plate in position, whereupon the contacts make the necessary connections. An unlimited number of combinations may be set up.

Each contact plate may be regarded as a motor-adapter, whereby the motors are adapted to operate in a manner and from a circuit corresponding to the arrangement of the connections on each plate. It is obvious that the complete set of contact plates constitute motor-adapting means whereby the owner of the motor is enabled to selectively adapt the motor to various circuits or for various characteristics of motor operation.

Variations may be resorted to within the scope of the invention, and portions of the improvements may be used without others.

Having thus described my invention, I claim:

1. As a new article of manufacture, the combination of a plate of insulating material, electrical contacts mounted thereon for electrically engaging the terminals of the armature coils, field coils and auxiliary coils of a convertible motor, wires supported on the plate electrically connecting the contacts together, and a separate plate secured over said contact-plate and forming therewith a box having top, sides and ends constituted of said separate plate and a bottom constituted of the contact-plate, said box enclosing said wires.

2. A motor-adapter including an insulating member, provided with contacts, having interconnectible terminals, said contacts corresponding to the several terminals of a motor of the character herein described, a box or device forming a protective covering for said contact-terminals, certain contact-terminals being electrically connected with others in a predetermined arrangement, whereby, upon attachment of said motor-adapter to said motor, said motor is automatically adapted to operate in a manner and from a circuit corresponding to said predetermined arrangement.

ALFRED E. OSWALD.